US008688943B2

(12) United States Patent
Hays et al.

(10) Patent No.: US 8,688,943 B2
(45) Date of Patent: Apr. 1, 2014

(54) PROCESSING SYSTEM WITH EXTERNAL MEMORY ACCESS CONTROL (75) Inventors: Paul J Hays, Lafayette, CO (US); Craig B McAnally, Thornton, CO (US); William M Mansfield, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 311 days.

(21) Appl. No.: 13/002,547

(22) PCT Filed: Jul. 23, 2008

(86) PCT No.: PCT/US2008/070906
§ 371 (c)(1),
(2), (4) Date: Jan. 4, 2011

(87) PCT Pub. No.: WO2010/011220
PCT Pub. Date: Jan. 28, 2010

(65) Prior Publication Data
US 2011/0113173 A1    May 12, 2011

(51) Int. Cl.
*G06F 13/14* (2006.01)
(52) U.S. Cl.
USPC .......................................... 711/167; 711/168
(58) Field of Classification Search
None
See application file for complete search history.

(56) References Cited

U.S. PATENT DOCUMENTS

| 9,913,754 | | 3/2000 | Songer | |
|---|---|---|---|---|
| 6,330,647 | B1 | 12/2001 | Jeddeloh et al. | |
| 6,681,285 | B1 * | 1/2004 | Ng | 710/309 |
| 7,035,155 | B2 * | 4/2006 | Stimak et al. | 365/222 |
| 7,064,994 | B1 * | 6/2006 | Wu | 365/211 |
| 7,913,034 | B2 * | 3/2011 | Calvignac et al. | 711/105 |
| 2003/0137528 | A1 * | 7/2003 | Wasserman et al. | 345/700 |
| 2004/0059439 | A1 | 3/2004 | Brunheim | |
| 2005/0289292 | A1 | 12/2005 | Morrow et al. | |
| 2006/0090031 | A1 | 4/2006 | Kirshenbaum et al. | |
| 2007/0106860 | A1 | 5/2007 | Foster et al. | |
| 2007/0260815 | A1 * | 11/2007 | Guha et al. | 711/114 |
| 2007/0294471 | A1 | 12/2007 | Calvignac et al. | |
| 2008/0025126 | A1 * | 1/2008 | Jewell et al. | 365/228 |
| 2009/0144577 | A1 * | 6/2009 | Sarker | 713/340 |

FOREIGN PATENT DOCUMENTS

| EP | 1110136 | 6/2001 |
|---|---|---|
| EP | 1410186 | 5/2007 |
| JP | 2007013710 A | 1/2007 |
| WO | 0225448 A2 | 3/2002 |
| WO | 2006121202 A1 | 11/2006 |

* cited by examiner

*Primary Examiner* — Than Nguyen
(74) *Attorney, Agent, or Firm* — The Ollila Law Group LLC (57) ABSTRACT

A method for executing a processing routine that utilizes an external memory is provided. The processing routine requires more than one external memory access. The method comprises the step of distributing the external memory access after a predetermined number of external memory accesses.

15 Claims, 6 Drawing Sheets

PROCESSING SYSTEM WITH EXTERNAL MEMORY ACCESS CONTROL

TECHNICAL FIELD

The present invention relates to a processing system, and more particularly, to a method for controlling access to an external memory while executing a processing routine.

BACKGROUND OF THE INVENTION

Processing systems are generally known in the art and are utilized in a variety of devices. Some processing systems have an internal memory which supplies all of the processing system's data and/or instructions. However, internal memories have limited capacities and capabilities and thus, in some situations, the processing system is connected to an external memory, which augments the storage space of the internal memory. Additionally, external memories allow multiple processing systems to access the memory and therefore provide a greater flexibility.

A drawback to the use of an external memory is that accessing an external memory generally requires a greater amount of power than required to access an internal memory and in some situations can take a longer amount of time. Thus, in situations where the processing system is under power and/or time constraints, there is an incentive to minimize the external memory accesses. However, it may not be possible to include all of the data and/or instructions in the internal memory and thus, an external memory is often required.

In prior art processing systems, the external memory is accessed in bursts. In other words, a large block of external memory is accessed substantially consecutively. This results in a spike in the energy demands of the processing system. In environments where the processing system is not under an energy constraint, this type of memory access is adequate. However, where there are power constraints, for example, if the processing system is powered via a two-wire loop, a spike in required power can adversely affect components that share a power source with the processing system as the power delivered to the processing system is limited, in part, by the signaling sent on the two-wire loop. The example of the two-wire loop is merely an example and should not limit the scope of the invention as there are numerous other situations where the power delivered to a processing system is limited. Although prior art processing systems have attempted to reduce the overall power consumption, this is not always an adequate solution because even if the overall power consumption is reduced, temporary spikes in power consumption can still adversely affect the system.

Therefore, the present invention provides a method for executing a processing routine while controlling access to an external memory.

Aspects

According to an aspect of the invention, a method for executing a processing routine utilizing an external memory and requiring more than one external memory access, comprises the step of:

distributing the external memory accesses based on a predetermined number of consecutive external memory accesses.

Preferably, the method further comprises the step of distributing the external memory accesses such that the number of consecutive external memory accesses is minimized.

Preferably, the method further comprises the step of distributing the external memory accesses substantially evenly.

Preferably, the step of distributing the external memory accesses comprises temporarily interrupting access to the external memory for a predetermined amount of time after a predetermined number of consecutive external memory accesses.

Preferably, the processing routine further utilizes an internal memory and wherein the step of distributing external memory accesses comprises interrupting access to the external memory after a predetermined number of external memory accesses with a predetermined number of internal memory accesses.

Preferably, the predetermined number of consecutive external memory accesses is based on an available energy supply.

According to another aspect of the invention, a method for executing a processing routine utilizing an external memory, comprises the steps of:

determining an available energy supply; and accessing the external memory based on the available energy supply.

Preferably, the method further comprises the step of accessing the external memory only if the available energy supply exceeds a threshold value.

Preferably, the processing routine further utilizes an internal memory and the method further comprises the step of accessing the internal memory if the available energy supply does not exceed a threshold value.

Preferably, the method further comprises the step of distributing the external memory accesses if the available energy supply does not exceed a threshold value.

Preferably, the method further comprises the step of distributing the external memory accesses based on a predetermined number of consecutive external memory accesses.

Preferably, the predetermined number of consecutive external memory accesses is determined at least in part by the available energy supply level.

Preferably, the processing routine further utilizes an internal memory and the method further comprises the step of distributing access to the external memory by interrupting access to the external memory after a predetermined number of consecutive external memory accesses with a predetermined number of internal memory accesses.

According to another aspect of the invention, a processing system, comprising:

an external memory; and a processor adapted to execute a processing routine utilizing the external memory, wherein the processor is configured to distribute external memory accesses based on a predetermined number of consecutive external memory accesses.

Preferably, the processor is further configured to distribute the external memory accesses such that the number of consecutive external memory accesses is minimized.

Preferably, the processor is further configured to substantially evenly distribute the external memory accesses.

Preferably, the processor is further configured to temporarily interrupt access to the external memory for a predetermined amount of time after a predetermined number of consecutive external memory accesses.

Preferably, the processing system further comprises an internal memory, wherein the processor is further configured to distribute external memory accesses by interrupting access to the external memory after a predetermined number of external memory accesses with a predetermined number of internal memory accesses.

Preferably, the predetermined number of consecutive external memory accesses is based on an available energy supply.

DETAILED DESCRIPTION OF THE INVENTION

FIGS. 1-9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
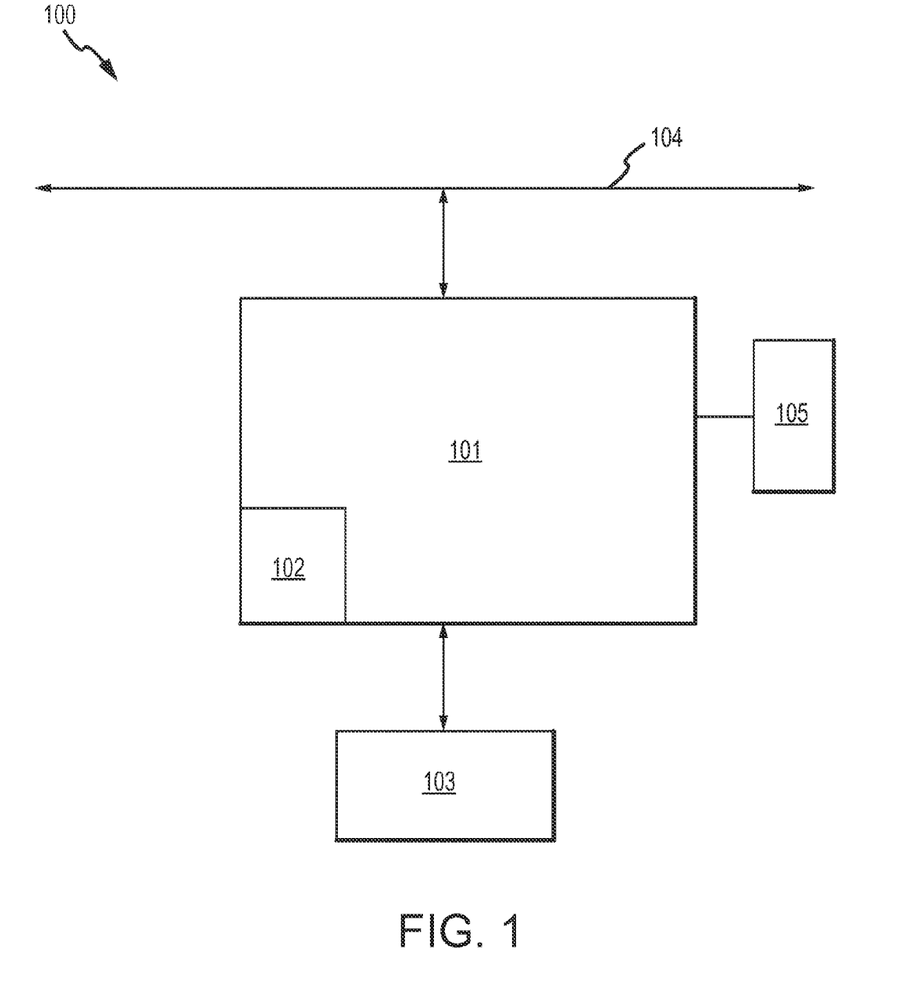
FIG. 1 shows a processing system 100 according to an embodiment of the invention.

FIG. 1 shows a processing system 100 according to an embodiment of the invention. The processing system 100 comprises a processor 101 connected to a power source 104. The power source 104 may comprise a power source with an unlimited power supply or may comprise a power source with a limited power supply, such as a two-wire loop, for example that is limited to providing a current between approximately 4 mA and approximately 20 mA. Thus, according to an embodiment of the invention, the processing system 100 operates with a constrained power supply. The processor 101 may conduct operations of the processing system 100 by executing one or more processing routines. The processing routine may include the reading and/or writing of instructions and/or data. The processor 101 can comprise a general purpose computer, a microprocessing system, a logic circuit, a digital signal processor, or some other general purpose or customized processing device. The processor 101 can be distributed among multiple processing devices. The processor 101 can include any manner of integral or independent electronic storage medium, such as the internal memory 102 and the external memory 103. Thus, the processing routines executed by the processor 101 may utilize the internal memory 102, the external memory 103, or both by storing information, such as instructions and/or data in the memories 102, 103. Furthermore, the processing system 100 can include an interface 105. The interface 105 may comprise any manner of display or input/output mechanism generally known in the art.

The memories 102, 103 can store data, software routines, constant values, and variable values. It should be appreciated that each time the processor 102 reads/writes information from/to the memories 102, 103, the processing system 100 requires an additional amount of energy. While the external memory 103 is required in many embodiments, accessing the external memory 103 requires more energy than accessing the internal memory 102. This is shown in FIG. 2.

Figure 2:
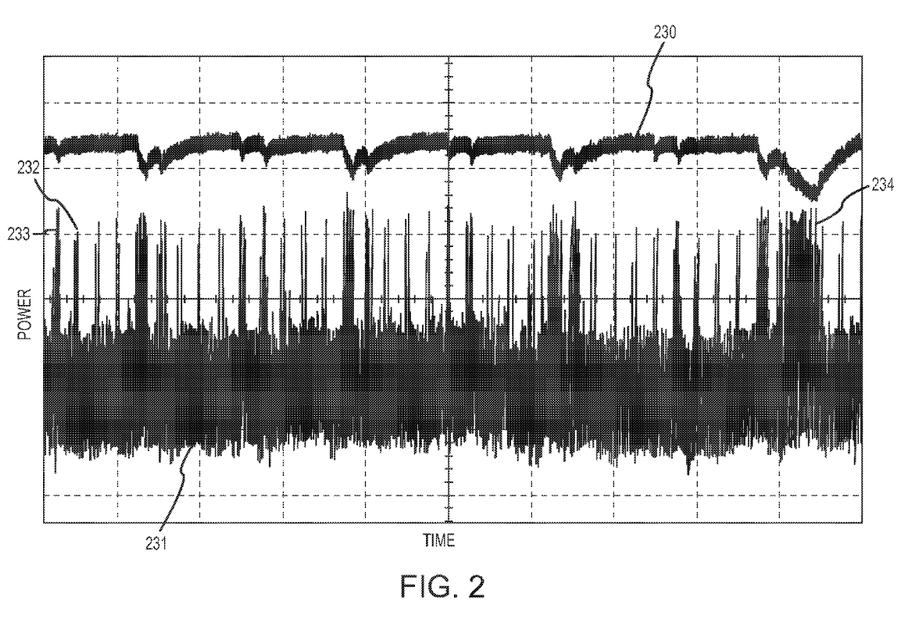
FIG. 2 shows a graph of the energy consumption of the processing system while accessing the memories.

FIG. 2 shows a graph of the power consumption of the processing system 100, and more specifically, the processor 101, while accessing the memories 102, 103. According to an embodiment of the invention, a processing routine utilizes one or both of the memories 102, 103. Therefore, the processor 101 is required to access the memories 102, 103 when executing a processing routine. The trace 230 represents an available energy supply. The available energy supply may represent the energy available to the processing system 100, the processor 101, or the electronic device in which the processing system 100 is contained. The available energy supply 230 may comprise an available current, voltage, or combination thereof. For example, in situations where the processing system 100 is powered by a two-wire loop, the available energy supply 230 may comprise an available current. However, it should be understood that the specific value of energy measured will depend on the particular situation and therefore, should not limit the scope of the present invention.

The trace 231 shows the memory accesses. Each spike in the trace 231 represents an external memory access. It should be appreciated that relatively few consecutive external memory accesses, such as seen at 232, for example, do not substantially affect the available energy supply. This can be seen by observing the energy supply available substantially directly above the spike at 232. However, as seen in the access at 233, as the number of consecutive external memory accesses increases, the level of the energy supply available to other applications decreases. The limitation on available energy is significant where access to the external memory 103 is implemented with multiple consecutive external memory accesses, such as seen at 234 where the energy required accessing the external memory 103 uses almost the entire reserve energy available. During such access bursts, the remaining components of the processing system 100 are left with almost no energy.

According to an embodiment of the invention, the available energy 230 is determined and access to the external memory 103 is restricted to times when the available energy 230 exceeds a threshold value. This ensures that accessing the external memory 103 will not substantially deplete the energy available to the remaining components of the electronic device or the processing system 100. This method also provides a substantially real time method for determining when to access the external memory 103. According to an embodiment of the invention, the threshold value may be a predetermined value. According to another embodiment of the invention, the threshold value may depend on the number of external accesses required to execute the processing routine. For example, the threshold value may reduce as the number of external accesses required to execute the processing routine reduces. This is because as seen in FIG. 2, as the number of required accesses reduces, the effect the accesses have on the available energy supply 230 reduces. Therefore, a relatively small number of external accesses will not create as large of a spike in the energy consumption of the processor 101.

According to an embodiment of the invention, the processor 101 can execute a processing routine that utilizes only the external memory 103. In this situation, the processing system 100 can determine the available energy supply and grant access to the external memory 103 based on the available energy supply. According to one embodiment, access is granted to the external memory 103 only if the available energy supply exceeds a threshold value. When the available energy supply is below or equal to the threshold value, the processing system 100 can temporarily restrict access to the external memory 103 until the available energy once again exceeds the threshold value. It should be understood that some processing routines only utilize the internal memory 102 and therefore, the method of restricting access to the internal memory 102 is equally applicable; however in many embodiments, the threshold value will be substantially lower for restricting access to the internal memory 102 than for restricting access to the external memory 103. This is because accessing the internal memory 102 requires less energy than accessing the external memory 103. According to another embodiment, access to the external memory 103 is granted according to one of the distributions described below in relation to FIGS. 5-9 when the available energy supply does not exceed the threshold value.

According to another embodiment of the invention, the processor 101 can execute a processing routine that utilizes both the internal memory 102 and the external memory 103. In this embodiment, the processing system 100 can determine the available energy supply and grant access to the external memory 103 based on the available energy supply. According to one embodiment, access to the external memory 103 is only granted if the available energy supply exceeds the threshold value. If on the other hand, the available energy supply does not exceed the threshold value, access to the external memory 103 is restricted, however, access to the internal memory 102 may be granted. Thus, the processor 101 can access the internal memory 102 during the periods where the available energy supply does not exceed the threshold value, and once the energy supply exceeds the threshold value, the processor 101 can again access the external memory 103.

According to another embodiment of the invention, if the available energy supply 230 does not exceed the threshold value, the processor 101 may distribute the external memory accesses according to one of the methods outlined below. The particular method can be chosen based on the available energy supply 203. It should be understood that "distribution" is meant to mean that access is spread out or separated by one of the methods used below rather than accessing in bursts as in the prior art. The accesses may be separated by periods of time where the processor 101 ceases all functions or the accesses may be separated by periods where the processor 101 simply switches accessing the particular memory, but may access a different memory, for example.

Figure 3:
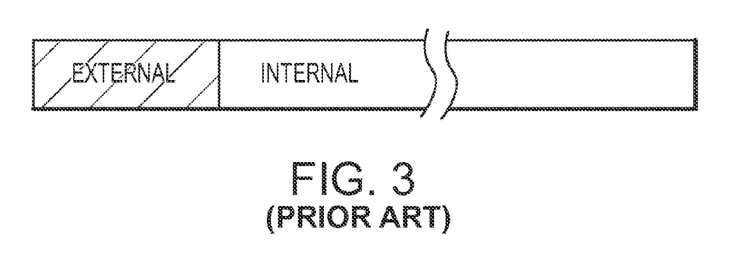
FIG. 3 shows the memory accesses of a processing system according to the prior art.

In many situations, the amount of information stored in the external memory 103 is substantially less than the amount of information stored in the internal memory 102. For a given processing routine, the processor 101 may require, for example, 1000 external memory accesses for every 100,000 total memory accesses. It should be understood however, that the ratio of 1 to 100 is used merely as an example and the actual ratio will vary depending on the particular processing routine. The prior art processing systems naturally group the 1000 external memory accesses together, i.e., burst access. As shown in FIG. 3, the processor 101, first performs all of the required external memory accesses, and then performs all of the required internal memory accesses. The source code associated with this high peak power for 100,000 total memory accesses could be written as:

$External_1$
$External_2$
$External_3$
●
$External_{1000}$
$Internal_1$
$Internal_2$
$Internal_3$
●
$Internal_{99000}$ Although such a grouping presents no problem with an unlimited power supply, as seen at access 234, such a burst in external memory accesses can substantially deplete the reserve power available for the remaining electronics when the processing system 100 is under a power constraint. One reason for such a grouping in the prior art processing systems is that it requires much less context switching. Thus, the overall bandwidth can be maximized.

Figure 4:
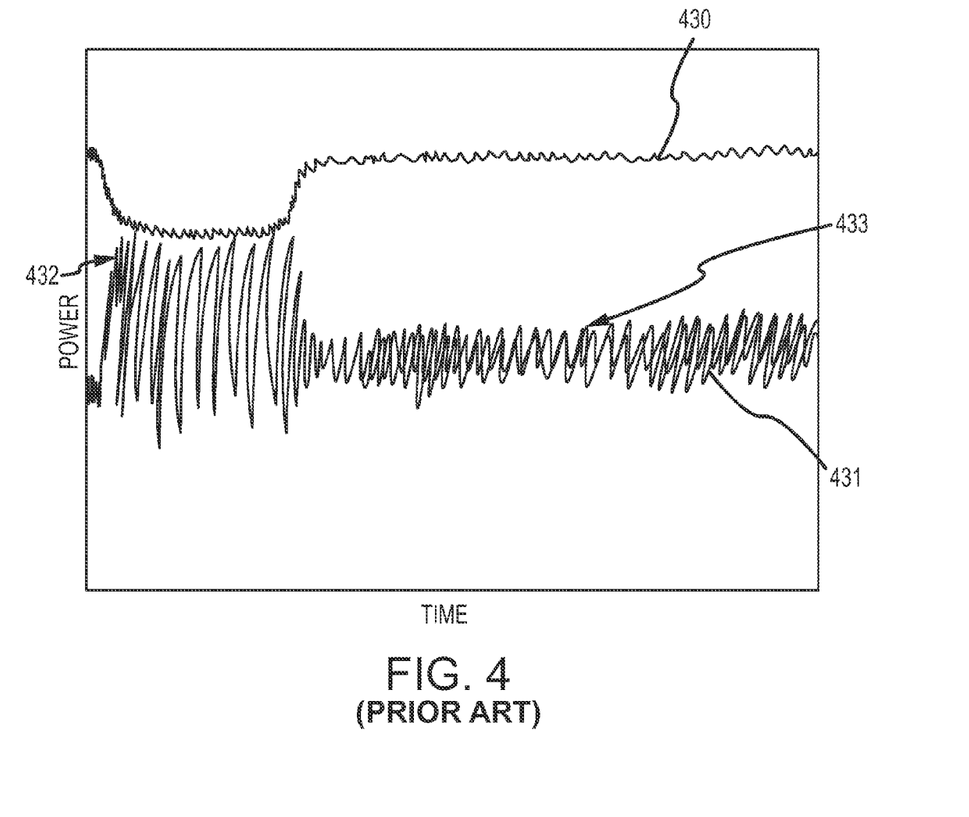
FIG. 4 shows a graph of the energy consumption of the processing system according to the prior art.

FIG. 4 shows a graph of the power consumption of the processor 101 while first accessing the external memory 103 and then accessing the internal memory 102 within a given time frame. The trace 430 represents the available energy supply at a given time; the trace 431 generally represents the energy consumption of the processor 101 while accessing the memories 102, 103. As can be seen, during the time when the processor 101 is accessing the external memory 103, generally represented at 432, the processor 101 consumes substantially all of the available energy supply. Once the processor 101 stops accessing the external memory 103 and begins accessing the internal memory 102, the power used by the processor 101 reduces.

As can be seen, such a "bursty" method of accessing the external memory 103 can present serious problems with the available energy supply. Thus, such a method is many times, unfavorable. According to an embodiment of the invention, in order to overcome energy constraint issues, the processor 101 distributes the external memory accesses on a predetermined basis. The distribution may be performed before or after compiling of the processing routine. Furthermore, the distribution may be performed manually, or substantially automatically as described below.

Figure 5:
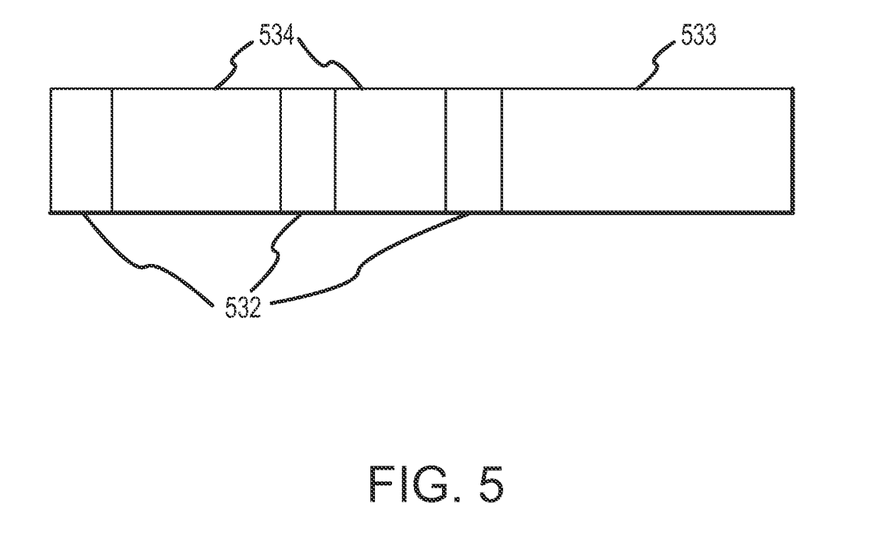
FIG. 5 shows the memory accesses of a processing system according to an embodiment of the invention.

FIG. 5 shows the memory accesses of the processor 101 while executing a processing routine according to an embodiment of the invention. According to the embodiment shown, the external memory accesses are distributed based on a predetermined number of consecutive external memory accesses. According to an embodiment of the invention, the processor 101 temporarily restricts access to both memories 102, 103 after a predetermined number of consecutive external memory accesses. In some embodiments, this may comprise pausing execution of the processing routine if the processing routine only utilizes the external memory 103. The temporary pause is shown at 534 where the processor 101 is not accessing the internal or the external memory 102, 103. After the temporary access restriction, the processor 101 can again access the external memory 103, which is shown generally at 532. The temporary access restriction may be based on a predetermined time or it may be based on an available energy supply. For example, access to the external memory 103 may be restricted until the energy supply rises above the threshold value. According to the embodiment shown in FIG. 5, the processor 101 does not access the internal memory 102 until the external memory accesses are complete.

Figure 6:
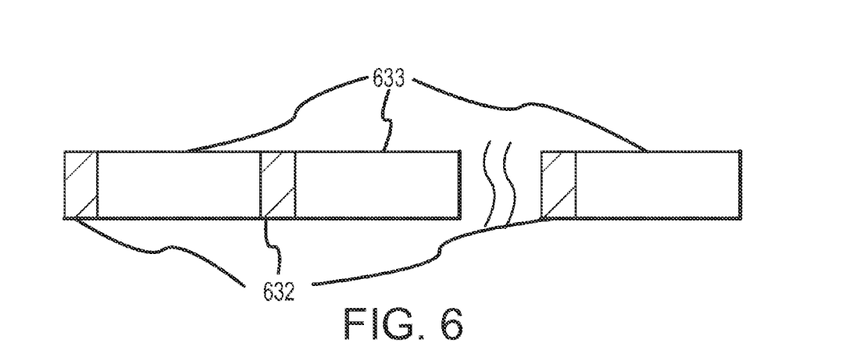
FIG. 6 shows the memory accesses of a processing system according to an embodiment of the invention.

FIG. 6 shows the memory accesses of the processor 101 according to another embodiment of the invention. According to the embodiment shown in FIG. 6, embodiment of the invention, the external memory accesses are distributed by temporarily interrupting access to the external memory after a predetermined number of external memory accesses with a predetermined number of internal memory accesses. Using the example of 100,000 total accesses, 1,000 of which are external memory accesses, the external memory accesses 632 are grouped in units of 10 accesses for every 1,000 internal memory accesses 633. By separating the external memory accesses 632 with internal memory accesses 633, the spikes in the power consumption decreases. This is because the higher power consumption associated with accessing the external memory 103 does not occur all at once. Rather, the lower power consumption required by the processor 101 to access the internal memory 102 provides the breaks in the high power consumption required to access the external memory 103. According to the embodiment shown in FIG. 6, the external memory accesses are substantially evenly separated by the internal memory accesses. However, in other embodiments, the separation does not have to be substantially even. The source code for such an algorithm could look something like:

$External_1$
●
$External_{10}$
$Internal_1$
●
$Internal_{1000}$
$External_{11}$
●
$External_{20}$
$Internal_{1001}$
●
$Internal_{2000}$, etc.

Figure 7:
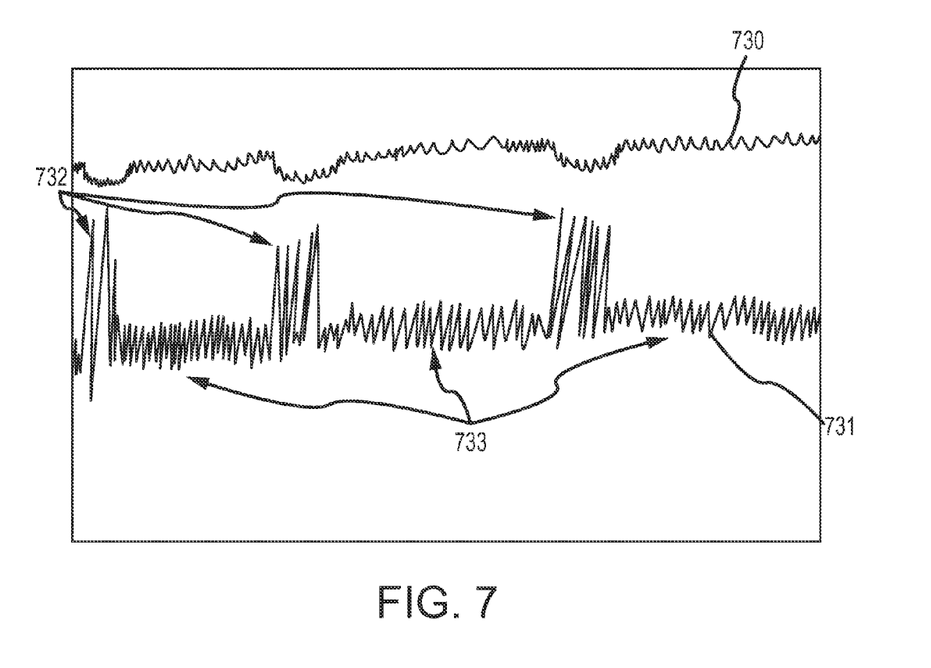
FIG. 7 shows a graph of the power consumption of meter electronics according to an embodiment of the invention.

FIG. 7 shows a graph of the energy consumption of the processor 101 when the external memory accesses are distributed according to the method outlined above in relation to FIG. 6. As can be seen, the energy consumption of the processor 101 spikes when the processing system 100 accesses the external memory 103, generally shown at points 732. Thus, distributing the external memory accesses based on a predetermined number of consecutive external memory accesses minimizes the energy consumption spikes, thereby allowing the processor 101 to access the external memory 103 at times when the available energy supply does not exceed the threshold value. Therefore, according to an embodiment of the invention, if the available energy supply does not exceed the threshold value, the external memory accesses can be distributed based on a predetermined number of consecutive external memory accesses. According to another embodiment of the invention, the external memory accesses can be distributed based on a predetermined number of consecutive external memory accesses even when the available energy supply does exceed the threshold value. The predetermined number of consecutive external memory accesses may be based on the available energy supply.

According to another embodiment of the invention, the predetermined number of consecutive external memory accesses may be substantially the same regardless of the available energy supply. However, in this embodiment, the predetermined number should be chosen such that the processor 101 can access the predetermined number of external memory locations even at the minimum available energy supply.

Figure 8:
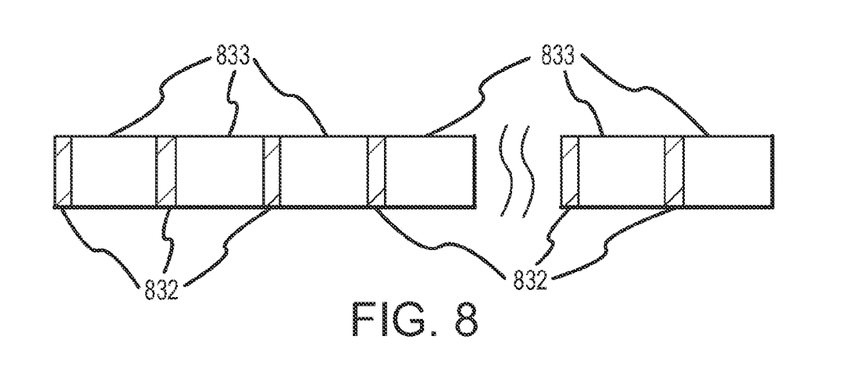
FIG. 8 shows the memory accesses of a processing system according to an embodiment of the invention.
Figure 9:
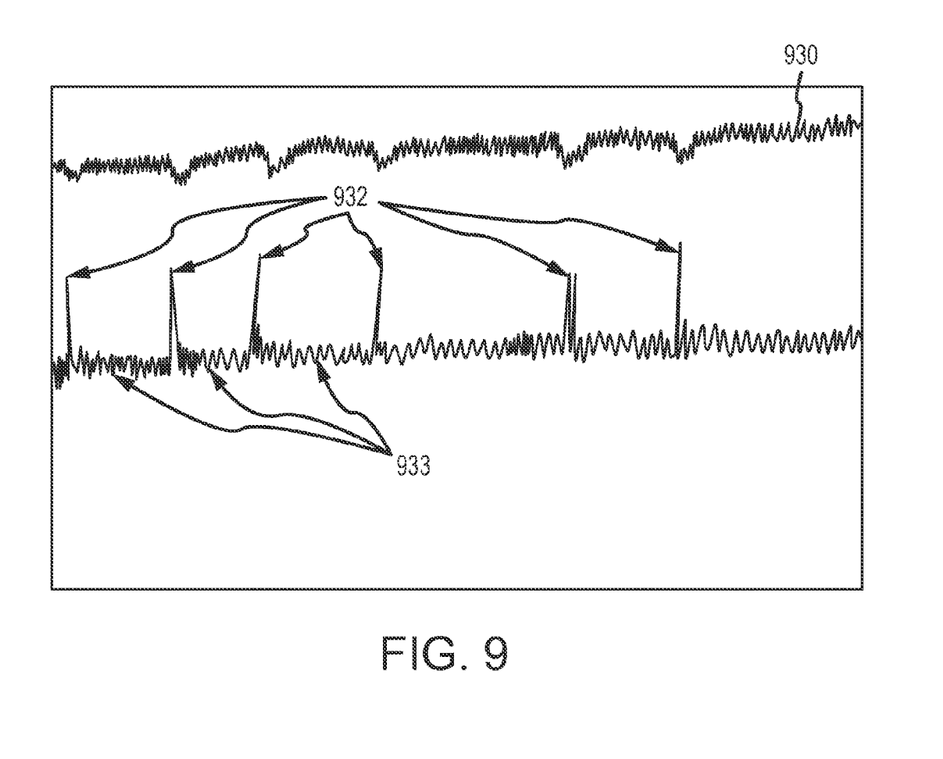
FIG. 9 shows a graph of the power consumption of meter electronics according to an embodiment of the invention.

FIG. 8 shows the memory accesses according to another embodiment of the invention. According to the embodiment shown in FIG. 8, the external memory accesses are distributed as far apart as possible. In other words, access to the external memory is distributed such that the number of consecutive external memory accesses is minimized. Taking the 100,000 accesses as an example again, the processor 101 accesses the external memory 103 once for every ten internal memory accesses. This minimizes the energy spikes caused by accessing the external memory 103. According to an embodiment of the invention, the number of external memory accesses along with the number of internal memory accesses is determined. Using these two numbers, the external memory accesses can be interrupted by the internal memory accesses according to the ratio of the external to internal memory accesses required to execute the processing routine. Thus, for example, if a particular processing routine requires four external memory accesses and two internal memory accesses, the ratio of external to internal would be 2:1. Therefore, one internal memory access would separate approximately two external memory accesses. A drawback to such an approach is that the processor 101 is continuously switching between the internal and the external memory 102, 103, i.e., "context switching" This can, in some embodiments, reduce the overall bandwidth. Thus, the reduced power consumption should be balanced with the context switching costs associated with disturbing the sequential, linear nature of the program. Therefore, according to some embodiments, distributing the external memory accesses as far apart as possible may not be the most advantageous approach. The source code for such an algorithm could be written as:

$External_1$
$Internal_1$
●
$Internal_{10}$
$External_2$
$Internal_{11}$
●
$Internal_{20}$ FIG. 9 shows a graph of the power consumption of the processor 101 as it accesses the external memory 103 and the internal memory 102 according to the method outlined above in relation to FIG. 8. As can be seen, the power consumption spikes at points 932 where the processor 101 accesses the external memory 103. However, there is only a single spike in power consumption at each of the points 932, this is because the processor 101 only accesses the external memory 103 once and then access to the external memory 103 is interrupted before returning to access information from the external memory 103 again. In some embodiments, the processor 101 accesses the internal memory 102 during the period when access to the external memory 103 is interrupted. As can be seen in the trace 930, accessing the external memory 103 on an individual basis impacts the reserve power available to the rest of the processing system 100 only minimally. Thus, by separating the external memory accesses as far apart as possible, there is much more reserve power available to the remainder of the system. The processor 101 is thereby capable of operating under severe power constraints by minimizing the power spikes associated with accessing the external memory 103 in large blocks at a time (burst access).

According to one embodiment, the invention outlined above provides a method for executing a processing routine where a portion of the processing routine is stored in an external memory 103 and a portion of the processing routine is stored in an internal memory 102. Therefore, in order to execute the processing routine, the processor 101 is required to access both the internal memory 102 and the external memory 103. The method reduces the peak power consumption of the processor 101 by distributing access to the external memory 101 according to a predetermined number of external memory accesses. Thus, the processor 101 does not access the external memory 103 in large bursts causing large spikes in the power consumption, as in the prior art. According to one embodiment, access to the external memory 103 remains inaccessible for a predetermined amount of time. According to another embodiment of the invention, access to the external memory 103 remains inaccessible until the processor 101 performs a predetermined number of internal memory accesses. The predetermined number of accesses for the internal and external memory may be the same number or may be a different number. The particular predetermined numbers will depend on the particular situation and the particular number of total accesses required by the processing routine. Once the processor 101 completes the predetermined number of internal memory accesses, the processor 101 can again return to accessing the external memory 103.

As described above, in some embodiments, the predetermined numbers used to distribute access to the external memory 103 are chosen such that the number of consecutive external memory accesses is minimized. According to another embodiment of the invention, the predetermined numbers are substantially constant throughout the processing routine. Therefore, the distribution of access to the external memory 103 is substantially even throughout the processing routine. According to other embodiments, the predetermined numbers may vary and therefore, the number of accesses performed by the processor 101 will change as the processor 101 executes the processing routine. According to another embodiment of the invention, the external memory accesses are interrupted by internal memory accesses according to the approximate ratio of external to internal memory accesses. Thus, for example, if the ratio of internal memory accesses to external memory accesses required is 2:1, access to the external memory will be interrupted after every external access, and will remain interrupted for two internal memory accesses before the processor 101 returns to accessing the external memory.

The method of distributing the accesses can be carried out in a variety of manners. The distribution may take place manually, in software, or in hardware. According to one embodiment of the invention, the distribution is performed after the compiling of the processing routine. According to another embodiment of the invention, the distribution is performed before the compiling of the processing routine. According to one embodiment of the invention, distributing the accesses is carried out by manual distribution. Manual distribution of the external memory accesses can be achieved via inspection and hand-distribution of the source code. This can be accomplished by inspection and hand-distributing the source code. Although this method is suitable for some situations, it is error-prone and time consuming. Furthermore it must be performed for every new code change or software release, thereby furthering the time required.

According to another embodiment of the invention, the memory accesses are distributed in software. According to one embodiment, the software may be modified using a post-processing program. This method is briefly shown above where a 'jump' is inserted every 'n' instructions. For example, in the discussion accompanying FIGS. 8 and 9, a jump, i.e., instructions for internal access is inserted for every 'n' external accesses. This has the effect of dividing the processing source between internal and external memories 102, 103.

According to another embodiment of the invention, a real time operating system (RTOS) is utilized. According to this embodiment, each task of the processor 101 has a property that defines the task in internal or external memory 102, 103. The external tasks are preemptively interrupted after 'n' instructions. The external tasks are not allowed to resume execution until 'm' internal instructions have been performed. In this context, 'n' and 'm' are the number of locations required to be accessed in the external and internal memories 103, 102, respectively. In addition, the RTOS can be programmed to keep the size of 'n' as small as possible. According to another embodiment of the invention, the RTOS can be programmed to keep 'n' and 'm' relatively constant over time, thereby maximizing the optimal distribution of external memory accesses.

According to another embodiment of the invention, the distribution of memory accesses can be implemented in hardware in which a memory cache is modified to access the external memory in a temporarily optimum manner. According to one embodiment, the temporarily optimum manner comprises one external memory access for every 'n' total accesses. One drawback to this embodiment is that it requires an internal cache memory. However, in embodiments where an internal cache memory is available, this embodiment may be implemented. Other methods generally known in the art may be used to program the processing system and are therefore included within the scope of the present invention.

The above description provides a method for programming a processing routine required to access external memory 103. In some embodiments, the processing routine utilizes internal memory 102 as well. The method distributes (interrupts) the external memory accesses based on a predetermined number of consecutive external memory accesses. Although portions of the above description makes reference to a particular number of accesses, it should be understood that the numbers are used solely to assist in the understanding of the invention, and should not in any way limit the scope of the invention as the particular number of accesses will vary depending on the processing routine. Furthermore, the present invention should not be limited by the particular ratio of external memory accesses to internal memory accesses as the ratio can vary from less than, greater than, or equal to one.

The above description also provides a method for controlling access to an external memory 103 based on an available energy supply. Thus, the method ensures that the energy consumed by the processor 101 while accessing the external memory 103 does not exceed the available energy supply. It should be appreciated that the two methods (controlling access based on available energy and access distribution) may be used together or separately as needed.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other processing systems, and not just to the embodiments described above and shown in the accompanying figures. Accordingly, the scope of the invention should be determined from the following claims.

We claim:

1. A method for executing a processing routine utilizing an internal memory and an external memory and requiring more than one external memory access, comprising the step of:
distributing the external memory accesses based on a predetermined number of consecutive external memory accesses wherein distributing external memory accesses comprises interrupting access to the external memory after a predetermined number of external memory accesses with a predetermined number of internal memory accesses.

2. The method of claim 1, further comprising the step of distributing the external memory accesses such that the number of consecutive external memory accesses is minimized.

3. The method of claim 1, further comprising the step of distributing the external memory accesses substantially evenly.

4. The method of claim 1, wherein the step of distributing the external memory accesses comprises temporarily interrupting access to the external memory for a predetermined amount of time after a predetermined number of consecutive external memory accesses.

5. The method of claim 1, wherein the predetermined number of consecutive external memory accesses is based on an available energy supply.

6. A method for executing a processing routine utilizing an internal memory and an external memory, comprising the steps of:
   determining an available energy supply;
   accessing the external memory only if the available energy supply exceeds a threshold value; and
   accessing the internal memory if the available energy supply does not exceed the threshold value.

7. The method of claim 6, further comprising the step of distributing the external memory accesses if the available energy supply does not exceed a threshold value.

8. The method of claim 7, further comprising the step of distributing the external memory accesses based on a predetermined number of consecutive external memory accesses.

9. The method of claim 8, wherein the predetermined number of consecutive external memory accesses is determined at least in part by the available energy supply level.

10. The method of claim 7, wherein the processing routine further utilizes an internal memory and the method further comprises the step of distributing access to the external memory by interrupting access to the external memory after a predetermined number of consecutive external memory accesses with a predetermined number of internal memory accesses.

11. A processing system (100), comprising:
   an internal memory (102) and an external memory (103); and
   a processor (101) adapted to execute a processing routine utilizing the internal memory (102) and the external memory (103), wherein the processor (101) is configured to:
      distribute external memory accesses based on a predetermined number of consecutive external memory accesses; and
      distribute external memory accesses by interrupting access to the external memory (103) after a predetermined number of external memory accesses with a predetermined number of internal memory accesses.

12. The processing system (100) of claim 11, wherein the processor (101) is further configured to distribute the external memory accesses such that the number of consecutive external memory accesses is minimized.

13. The processing system (100) of claim 11, wherein the processor (101) is further configured to substantially evenly distribute the external memory accesses.

14. The processing system (100) of claim 11, wherein the processor (101) is further configured to temporarily interrupt access to the external memory (103) for a predetermined amount of time after a predetermined number of consecutive external memory accesses.

15. The processing system (100) of claim 11, wherein the predetermined number of consecutive external memory accesses is based on an available energy supply.

* * * * *